UNITED STATES PATENT OFFICE 2,166,136

METHOD OF FORMING NUCLEAR ALKYL DERIVATIVES OF PHENOLS

Lawrence H. Flett, Hamburg, N. Y., assignor to National Aniline & Chemical Company, Inc., New York, N. Y., a corporation of New York No Drawing. Application September 26, 1935, Serial No. 42,354. Renewed December 1, 1936

15 Claims. (Cl. 260—624)

This invention relates to improvements in the production of detergents. It relates more particularly to improvements in the production of nuclear alkyl derivatives of phenol and cresols, and specifically to improvements in the method of forming nuclear alkyl derivatives of phenol and cresols by the condensation of an alkyl halide containing at least 12 carbon atoms with phenol or a cresol, for use in the production of sulfonated derivatives thereof useful as detergents.

Alkyl phenol sulfonates having the general formula:

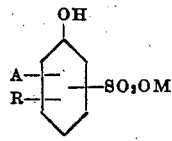

in which A represents hydrogen or a methyl group, R represents an open chain alkyl hydrocarbon (saturated or unsaturated) containing 12 or more (preferably 12 to 23, and especially 14 to 19) carbon atoms, and M represents hydrogen or a metal, particulary an alkali metal, or an ammonium or organic ammonium radical, constitute an important class of synthetic detergent materials.

One important method of preparing them involves condensing phenol (hydroxybenzene) or a cresol (1,2-, 1,3- or 1,4-methyl-hydroxybenzene) with an alkyl halide containing at least 12 carbon atoms, more particularly 12 to 23 carbon atoms and especially 14 to 19 carbon atoms, and sulfonating the resulting alkyl phenol or cresol.

According to the present invention, the condensation of phenol or a cresol with an alkyl halide containing at least 12 carbon atoms, more particulary 12 to 23 carbon atoms, and especially 14 to 19 carbon atoms, is carried out by heating phenol or a cresol with the alkyl halide and a zinc condensing agent at a condensation temperature for a considerable period of time after substantially no increase in yield of condensation product results from further heating at said temperature.

As zinc condensing agents there may be employed anhydrous zinc chloride and/or a zinc substance capable of reacting with a hydrohalide to form a zinc halide (as for example, zinc oxide, zinc, etc.). During the condensation with zinc or zinc oxide, a zinc halide is probably formed and hence also with these substances the condensation apparently takes place in the presence of a zinc halide. In general, anhydrous zinc chloride is preferably employed as the condensing agent since, on the whole, it gives more uniform products and better yields, as well as sulfonated products of superior color and quality. It is noted that zinc chloride referred to as "anhydrous" may contain small amounts of water, for instance, such as are absorbed from the surrounding atmosphere or otherwise in commercial operation, but insufficient to interfere with its action as a condensing agent. Even when the zinc chloride contains an equal weight of water it functions as a condensing agent; but such large amounts of water are preferably avoided.

The proportion of alkyl halide employed with respect to the phenol may vary; but preferably the amount employed is such that not more than one alkyl radical of the type represented by R in the foregoing formula is contained in the resulting alkyl phenol. Thus, at least 1.25 mols of phenol per mol of alkyl halide is preferably employed in the condensation. A molar ratio as low as 1 to 1, or even lower, may be employed, but the yield of the resulting alkyl phenol containing one alkyl radical of the said type represented by R will be less.

The amount of zinc chloride or other zinc substance employed is only a fraction of the weight of the alkyl halide and may be as low as 1 per cent of the weight of the alkyl halide. In general an amount of zinc chloride equal to about 5 to about 20 per cent of the weight of the alkyl halide is preferably employed although greater amounts may be used.

While the condensation may be carried out at various temperatures, as for example from room temperature to refluxing (about 190° C.) or higher, it has been found according to the present invention that temperatures above 100° C. are preferably employed with zinc condensing agents.

The time during which the condensation reaction of the alkyl halide and the phenol or cresol may be carried out may be varied; however, the minimum period of heating of the reaction mixture at a condensation temperature is considerably in excess of that required to effect mere combination of the phenol compound and the alkyl halide. I have found that the alkyl phenols resulting from the extended heating in accordance with the present invention, when converted to alkyl phenol sulfonates, result in products of much superior detergent action as compared with those produced by heating at the same temperature merely until condensation appears to be complete, as indicated by the yield of condensation product. Thus, in the condensation of tetradecyl chloride and phenol with the aid of anhydrous zinc chloride, heating the reaction mixture for 1 hour at 135° C. results in a yield of condensation products substantially equal to that resulting from carrying out the reaction at higher temperatures and/or for considerably longer periods of time. The detergent action of the resulting product, when converted to a detergent by sulfonation of the alkyl phenol, is very much inferior to that of a product resulting from heating the reaction mixture for more than 4 hours at 135° C. Hence, in accordance with the present invention, at temperatures of about 135° C., the reaction mixture is preferably heated for at least 4 hours, and still more preferably for about 7 hours or more. At higher temperatures a correspondingly shorter period of reaction may be employed. Thus, for example, at 160° C., the reaction mixture is preferably heated for more than 1 hour, and more particularly from 2 to 7 hours. With zinc chloride as the condensing agent, the period of heating at refluxing temperature may be extended to 16 hours or more without seriously harming the quality or decreasing the yield of the alkyl phenol.

Without limiting the invention to any theoretical considerations it appears the continued heating probably results in rearrangement to the corresponding alkyl phenols of phenol ethers which may be formed, and probably also converts objectionable impurities to other products which do not appear in the alkyl phenol sulfonate products when the alkyl phenols are converted to detergents by sulfonation, or if present in said sulfonation products, do not exert a deleterious influence.

The invention will be illustrated by the following specific examples in which the parts are by weight and the temperatures are in degrees centigrade. It will be understood by those skilled in the art that the scope of the invention is not limited to these specific examples.

EXAMPLE 1.—*Sodium cetyl phenol sulfonate*

A mixture of 80 parts of cetyl chloride (prepared from commercial cetyl alcohol and boiling within the range 160° to 210° at 5 mm. pressure), 80 parts of phenol and 10 parts of anhydrous zinc chloride, while being agitated vigorously, is heated to a temperature of 175° and then is maintained for 6 hours at a temperature of 175° to 185°. The reaction mixture is allowed to cool, and the oil is decanted off and fractionally distilled in a vacuum. The fraction of the distillate boiling from 190° to 250° at 5 mm. of mercury pressure is separately collected. The product, which comprises cetyl phenol, is a viscous oil which is partially solid at room temperature and completely solid at 5°. An equal weight of 100% sulfuric acid is added to the product at a temperature of 10° to 25°. The reaction mass is agitated while maintaining this temperature until a test portion is not turbid in dilute alkaline solution. After drowning in ice water the solution is neutralized with aqueous sodium hydroxide and evaporated to dryness.

EXAMPLE 2.—*Sodium myristyl para-cresol sulfonate*

A mixture of 120 parts of myristyl bromide (prepared from the alcohol and boiling within the range 150° to 170° at 6 mm. pressure), 102 parts of para-cresol and 10 parts of zinc chloride (as a condensing agent) is agitated and heated at a temperature of about 175° (±5°) for 16 hours. After cooling, myristyl-para-cresol is obtained from the mass by decantation, fractional distillation in a vacuum, and collection of the fraction boiling from 175° to 235° at a pressure of 5 mm. of mercury. The product is a light-brown viscous oil. An equal weight of 100% sulfuric acid is added to the product at a temperature of 10° to 25°. The reaction mass is agitated while maintaining this temperature until a test portion is not turbid in dilute alkaline solution. After drowning in ice water the solution is neutralized with aqueous sodium hydroxide and evaporated to dryness.

EXAMPLE 3.—*Sodium lauryl phenol sulfonate*

A mixture of 185 parts of lauryl chloride (prepared from commercial lauryl alcohol), 100 parts of phenol and 30 parts of zinc chloride (as a condensing agent) is heated with agitation at a temperture of 170° to 180° under a reflux condenser for 20 hours. The reaction mixture is allowed to cool and the oil which separates is decanted off and fractionally distilled in a vacuum. The fraction of the distillate boiling between 150° and 230° at 4 mm. pressure of mercury is separately collected. It consists chiefly of lauryl phenol in admixture with other alkyl phenols. To 20 parts of the lauryl phenol product thus obtained, there is slowly added with agitation 20 parts of sulfuric acid monohydrate, and the mixture is maintained at a temperature of 30° to 35° for 3 hours or until the desired sulfonation is effected. The mass is diluted with 400 parts of water, and the solution thus obtained is neutralized with caustic soda and evaporated to dryness. The product thus obtained comprises a mixture of alkyl phenol sulfonates together with some sodium sulfate, of which a predominant compound is the sodium salt of lauryl phenol sulfonate having the probable formula:

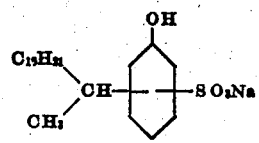

EXAMPLE 4.—Chlorine is passed into 328 parts of a kerosene (a Pennsylvania petroleum distillate) which boils from 235° to 240° at 760 mm. pressure while maintaining the temperature at 50°. To facilitate the reaction, the reaction mixture, which is contained in a glass reaction vessel, is subjected to direct sunlight during the treatment with chlorine and is well agitated. When the weight of the reaction mixture has increased about 58 parts the introduction of chlorine is discontinued and the agitation continued for about an additional fifteen minutes. The reaction mixture is subjected to fractional distillation and a middle fraction is collected between 165 and 175° at 34 mm. It comprises mainly monochlorinated hydrocarbons.

150 parts of the resulting chlorinated hydrocarbon product, 150 parts of phenol and 130 parts of anhydrous zinc chloride are agitated while being heated at 170° in a vessel provided with a reflux condenser. After about five hours the heating is discontinued, the mixture is allowed to cool, is washed with dilute hydrochloric acid (100 parts of 10 per cent. HCl), and is then distilled at 4 mm. pressure. The portion of the product boiling from 140° to 250° at 4 mm. pressure is separately collected, about three-fourths of which boils between 175° and 220°. The product is comprised mainly of a mixture of alkyl phenols which may be represented by the general formula:

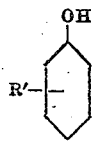

in which R' is a primary, secondary or tertiary alkyl group, which for the most part is probably in the para-position to the hydroxy group, the average number of carbon atoms in the groups represented by R' probably being about 14.

To 25 parts of the resulting alkyl phenol mixture there is slowly added with good agitation 31 parts of 100 per cent sulfuric acid. The acid is added at such a rate that the final temperature of the mixture, as the result of the heat of reaction, is about 60°. After all of the sulfuric acid has been added, the mixture is warmed to 80° and held there for about 15 to 20 minutes to complete the sulfonation. The reaction mass is then drowned in 200 parts of water, and caustic soda is added until the resulting solution is slightly alkaline to Brom Cresol Green Paper. The faintly alkaline mass is then evaporated to dryness, or it is converted to a dry product in any other suitable manner. The resulting product comprises a mixture of the sodium salts of sulfonated alkyl phenols, in which the alkyl groups have an average content of about 14 carbon atoms, mixed with the sodium sulfate resulting from neutralization of the residual sulfuric acid, and other impurities. It is a powdery mass of the nature of a soap powder, and is readily soluble in water, also in neutral, acid and weakly alkaline aqueous solutions.

EXAMPLE 5.—Chlorine is passed into 400 parts of a kerosene boiling from about 195° to about 300° (and boiling for the most part from about 225° to 275°) and having a specific gravity of 0.799 at 24°. The kerosene is contained in a lead lined vessel and is maintained at 50°. The chlorination is continued until the reaction mixture reaches a specific gravity of 0.91. 200 parts of the resulting chlorinated mixture, 125 parts of phenol and 25 parts of zinc dust are heated under refluxing, and agitation at 170° for about 4 hours. The oily product is decanted from the zinc residues and fractionally distilled in a vacuum. The portion of the distillate boiling from 160° to 260° at 4 mm. pressure is separately collected. It comprises a mixture of alkyl phenols in which the alkyl groups have a probable average content of 13 carbon atoms. When sulfonated it produces a detergent.

EXAMPLE 6.—Chlorine is passed into a kerosene (a purified Pennsylvania petroleum distillate) boiling from 245° to 315°, and of which 90 per cent distills between 260° and 305°, and having a specific gravity of 0.815, contained in a closed, lead-lined vessel which is equipped with a vent for hydrogen chloride produced by the chlorination. The chlorination is carried out in the dark, but to facilitate the chlorination the kerosene initially contains about 0.45 part of iodine per 1000 parts of kerosene. The temperature of the reaction mass is preferably maintained at about 45° to 50°. The introduction of chlorine is continued until the weight of the mass increases to an extent corresponding substantially with 115 per cent of the theoretical amount for the formation of the monochloride. The specific gravity of the reaction mixture reaches about 0.915.

560 parts of the resulting mixture of chlorinated hydrocarbons, 350 parts of phenol and 28 parts of granular anhydrous zinc chloride are agitated at room temperature for about 30 hours and then heated, with agitation, at about 135° for about 5 hours. The resulting reaction mass is cooled and added to about 600 parts of water, the mixture is heated to 70° with agitation, allowed to settle, and the upper, oil layer is separated and washed with hot water to remove zinc chloride and residual phenol. The washed oil is then treated with a small amount of alkali (7 parts of a 50 per cent solution of sodium hydroxide) and distilled in vacuo (e. g., 4 mm. pressure) in a still equipped with a fractionating column. Fractions boiling between about 140° and 230° at 4 mm. pressure are collected as separate products or as one product.

262 parts of one of the resulting mixtures of alkyl phenols (the resulting product or one of the fractions thereof) are sulfonated by agitating well with 262 parts of 100 per cent sulfuric acid, while maintaining the temperature at 20° to 30°. When the sulfonation has been effected, the reaction mass is drowned in 1500 parts of water, treated with sufficient caustic soda to render it neutral to Delta paper (about 260 parts of a 50 per cent solution of caustic soda), and evaporated to dryness.

It will be realized by those skilled in the art that changes may be made in the products, and in the processes of preparing them, hereinbefore described, without departing from the scope of the invention.

Thus, phenol, ortho-, meta-, or para-cresol or their mixtures may be employed.

Various alkyl halides containing at least 12 carbon atoms may be employed; as for example, chlorides and bromides of the saturated and unsaturated hydrocarbons of the aliphatic class, including straight-chain and branched-chain carbon linkages, in which the halogen atom is linked to an end carbon atom or an intermediate carbon atom, and particularly the monochlorides and monobromides. Those in which the hydrocarbon radical of the halide contains a branched carbon chain or which result in a product in which the radical represented by R in the foregoing formula contains a branched carbon chain are preferred. Further, mixed alkyl halides are preferred and particularly mixtures of chlorinated hydrocarbon mixtures such as can be obtained by the chlorination or bromination of selected fractions of mineral oil or related hydrocarbon mixtures, containing predominantly at least 12 carbon atoms, and preferably an average of about 14 to 19 carbon atoms.

When the alkyl phenol sulfonates are to be employed as detergents, the crude alkyl phenol resulting from the condensation of the alkyl halide with phenol or a cresol is preferably purified, as for example, by fractional vacuum distillation, and the purified compound is preferably employed for sulfonation. In the fractional distillation, a pressure not exceeding 30 mm., and particularly not exceeding 10 mm., is preferred. Preferably the purified alkyl phenol is collected as a middle fraction of the distillate over a temperature range which may be as high as 140° C., but which preferably does not exceed 100° C.

As sulfonating agents there may be employed sulfuric acids of various strengths (e. g., 66° Bé. sulfuric acid, sulfuric acid monohydrate, oleum), chlorsulfonic acid, etc.

The sulfonation may be carried out in the presence or absence of an inert organic solvent or diluent and in the presence or absence of a sulfonation assistant. As solvents or diluent there may be employed any inert organic liquid which is not readily sulfonated, such as halogenated hydrocarbons of the aliphatic and aromatic series; as for example, carbon tetrachloride, dichlorethane, tetrachlorethane, dichlorbenzene, etc. As sulfonation assistants there may be employed the lower organic acids and/or their anhydrides, as for example, acetic acid, acetic anhydride, etc.

The temperature at which the sulfonation is carried out may vary within wide limits. For example, temperatures as low as about 0° and as high as about 140° may be employed. In general the more vigorous the sulfonating agent the lower is the preferred temperature. Ordinarily the completion of the sulfonation is carried out at a temperature in the neighborhood of about 25° to about 80° C. The ratio of sulfonating agent employed with respect to the alkyl phenol also may be varied. Thus an amount of sulfuric acid or other sulfonating agent equivalent to from 1 to about 5 parts by weight of sulfuric acid monohydrate per part by weight of the alkyl phenol may be employed.

The extent to which the sulfonation is carried out may vary with the individual material being sulfonated and the use to be made of the sulfonated product. In general the extent of sulfonation of the alkyl phenol treated is such as to form chiefly the monosulfonic acid of the alkyl phenol, and to sulfonate impurities as well, if present.

The alkyl phenol sulfonates may be recovered in the form of their free sulfonic acids or in the form of salts of metals (as for example, of the alkali metals) or of organic bases, or of ammonia, etc. The salts may be obtained in any suitable manner, for example by reacting the sulfonated product, either in the crude form resulting from the sulfonation or in a purified form, with a metal oxide or hydroxide, ammonia or an organic base, or of a suitable salt of one of these, in an amount adapted to form a neutral product. Among the bases, oxides and salts which may be combined with the sulfonated products to produce salts useful as detergents and otherwise are, for example, sodium, potassium and ammonium hydroxides; sodium, potassium and ammonium carbonates and bicarbonates; ammonia; magnesium oxide; ethylamine; pyridine; triethanolamine; propanolamines; butanolamines; diamino propanol; ethylenediamine; triethylene tetramine, etc.

The reaction mixtures resulting from the sulfonation of the alkyl phenol or cresol may also be directly employed for the formation of mixed products, as for example mixtures of salts of the alkyl phenol sulfonic acid and other acids present in said reaction mixtures, which mixtures of salts are also useful as such. Thus, the sulfonation reaction mixture resulting from the treatment of the alkyl phenol or cresol with an amount of sulfonating agent in excess of that theoretically required to effect the desired degree of sulfonation may be treated with a suitable inorganic or organic base or basic salt (as for example, one of those mentioned) and the resulting mixture of the salt of the sulfonated alkyl phenol or cresol and the organic or inorganic salt (as for example, sodium sulfate) may be jointly isolated from the reaction mixture and employed as such. If it is desired to produce a salt of the sulfonated alkyl phenol or cresol in a form substantially free from metal salts of inorganic acids (for example, inorganic sulfates) this may be accomplished by taking advantage of the solubility of the salts of the sulfonated products in alcohol and other organic solvents.

This application is a continuation-in-part of my copending applications Serial Nos. 691,081 and 691,082, filed September 26, 1933, and Serial No. 737,777, filed July 31, 1934.

I claim:

1. The method of producing nuclear alkyl derivatives of phenols which comprises heating at a condensation temperature a reaction mixture containing a phenol compound selected from the group consisting of phenol and its mono-methyl derivatives, an open-chain alkyl mono-halide containing at least 12 carbon atoms and a zinc condensing agent, and continuing the heating for a considerable period of time after substantially no increase in yield of condensation product is obtained.

2. The method of producing nuclear alkyl derivatives of phenols, which comprises heating at a condensation temperature a reaction mixture containing a phenol compound selected from the group consisting of phenol and its mono-methyl derivatives, an open-chain alkyl mono-chloride containing 12 to 23 carbon atoms and a zinc condensing agent, and continuing the heating for a considerable period of time after substantially no increase in yield of condensation product is obtained.

3. The method of producing nuclear alkyl derivatives of phenols which comprises heating a reaction mixture containing a phenol compound selected from the group consisting of phenol and its mono-methyl derivatives, an open-chain alkyl mono-halide containing at least 12 carbon atoms and a zinc condensing agent at a temperature of at least 100° C., and continuing the heating for a considerable period of time after substantially no increase in yield of condensation product is obtained.

4. The method of producing nuclear alkyl derivatives of phenols, which comprises heating at a condensation temperature a reaction mixture containing a phenol compound selected from the group consisting of phenol and its mono-methyl derivatives, an open-chain alkyl mono-halide containing at least 12 carbon atoms and zinc chloride as a condensing agent, and continuing the heating for a considerable period of time after substantially no increase in yield of condensation product is obtained.

5. The method of producing nuclear alkyl derivatives of phenols, which comprises heating at a condensation temperature a reaction mixture containing a phenol compound selected from the group consisting of phenol and its mono-methyl derivatives, an open-chain alkyl mono-halide containing at least 12 carbon atoms, and zinc chloride as a condensing agent, and continuing the heating for a considerable period of time after substantially no increase in yield of condensation product is obtained, the amount of zinc chloride being not more than 20% of the weight of the alkyl mono-halide.

6. The method of producing nuclear alkyl derivatives of phenol, which comprises heating at a condensation temperature a reaction mixture containing phenol, an open-chain alkyl mono-halide containing at least 12 carbon atoms, and a zinc condensing agent, the amount of phenol being at least 1.25 mol per mol of the alkyl halide, and continuing the heating for a considerable period of time after substantially no increase in yield of condensation product is obtained.

7. The method of producing nuclear alkyl derivatives of phenol, which comprises heating at a condensation temperature a reaction mixture containing phenol, an open-chain alkyl monochloride containing 12 to 23 carbon atoms, and a zinc condensing agent, the amount of phenol being at least 1.25 mol per mol of the alkyl chloride, and continuing the heating for a considerable period of time after substantially no increase in yield of condensation product is obtained.

8. The method of producing nuclear alkyl derivatives of phenol which comprises heating a reaction mixture containing phenol, an open-chain alkyl mono-chloride containing at least 12 carbon atoms, and a zinc condensing agent at a temperature of at least 100° C., the amount of phenol being at least 1.25 mol per mol of the alkyl chloride, and continuing the heating for a considerable period of time after substantially no increase in yield of condensation product is obtained.

9. The method of producing nuclear alkyl derivatives of phenols which comprises heating a reaction mixture containing a phenol compound selected from the group consisting of phenol and its mono-methyl derivatives, an open-chain alkyl mono-halide containing at least 12 carbon atoms, and a zinc condensing agent at a temperature of at least 135° C. for at least 4 hours.

10. The method of producing nuclear alkyl derivatives of phenols which comprises heating a reaction mixture containing a phenol compound selected from the group consisting of phenol and its mono-ethyl derivatives, an open-chain alkyl mono-chloride containing 12 to 23 carbon atoms, and a zinc condensing agent at a temperature of at least 135° C. for at least 4 hours, the amount of phenol compound being at least 1.25 mol per mol of alkyl chloride.

11. The method of producing nuclear alkyl derivatives of phenols which comprises heating a reaction mixture containing a phenol compound selected from the group consisting of phenol and its mono-methyl derivatives, an open-chain alkyl mono-halide containing at least 12 carbon atoms and a zinc condensing agent at a temperature of at least 160° C. for at least 2 hours.

12. The method of producing nuclear alkyl derivatives of phenols which comprises heating a reaction mixture containing a phenol compound selected from the group consisting of phenol and its mono-methyl derivatives, an open-chain alkyl mono-chloride containing 12 to 23 carbon atoms, and zinc chloride as a condensing agent, at a temperature of at least 160° C. for at least 2 hours, the amount of phenol compound being at least 1.25 mol per mol of alkyl chloride.

13. The method of producing nuclear alkyl derivatives of phenols useful as detergents, which comprises heating at a condensation temperature a reaction mixture containing a phenol compound selected from the group consisting of phenol and its mono-methyl derivatives, an open-chain alkyl mono-halide containing at least 12 carbon atoms and a zinc condensing agent, continuing the heating for a considerable period of time after substantially no increase in yield of condensation product is obtained, and sulfonating the resulting alkyl phenol.

14. The method of producing nuclear alkyl derivatives of phenols useful as detergents, which comprises heating a reaction mixture containing a phenol compound selected from the group consisting of phenol and its mono-methyl derivatives, an open-chain alkyl mono-halide containing at least 12 carbon atoms, and a zinc condensing agent at a temperature of at least 135° C. for at least 4 hours, separating resulting alkyl phenol from the reaction mixture, and sulfonating separated alkyl phenol.

15. The method of producing nuclear alkyl derivatives of phenols useful as detergents, which comprises heating a reaction mixture containing a phenol compound selected from the group consisting of phenol and its mono-methyl derivatives, an open-chain alkyl mono-halide containing at least 12 carbon atoms and a zinc condensing agent at a temperature of at least 160° C. for at least 2 hours, separating resulting alkyl phenol from the reaction mixture, and sulfonating separated alkyl phenol.

LAWRENCE H. FLETT.

---

CERTIFICATE OF CORRECTION.

Patent No. 2,166,136.      July 18, 1939.

LAWRENCE H. FLETT.

It is hereby certified that error appears in the printed specification of the above numbered patent requiring correction as follows: Page 3, second column, line 3, for "30 hours" read 3 hours; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.